(12) United States Patent
Takami

(10) Patent No.: US 6,589,692 B2
(45) Date of Patent: Jul. 8, 2003

(54) ALUMINUM BATTERY WITH ALUMINUM-CONTAINING NEGATIVE ELECTRODE

(75) Inventor: Norio Takami, Yokohama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 127 days.

(21) Appl. No.: 09/793,877

(22) Filed: Feb. 28, 2001

(65) Prior Publication Data

US 2001/0028979 A1 Oct. 11, 2001

(30) Foreign Application Priority Data

Mar. 1, 2000 (JP) .................................... 2000-056454

(51) Int. Cl.$^7$ ............................................... H01M 6/04
(52) U.S. Cl. ...................... 429/199; 429/200; 429/201; 429/204; 429/205
(58) Field of Search ................. 429/199, 200, 429/201, 204, 205

(56) References Cited

U.S. PATENT DOCUMENTS

| | | | |
|---|---|---|---|
| 2,554,447 A | | 5/1951 | Sargent et al. |
| 2,838,591 A | | 6/1958 | Stokes et al. |
| 3,887,399 A | * | 6/1975 | Seiger .......................... 429/15 |
| 4,063,005 A | * | 12/1977 | Mamantov et al. ......... 429/103 |
| 4,882,244 A | * | 11/1989 | Donahue et al. ............. 429/199 |
| 5,998,063 A | * | 12/1999 | Kobayashi et al. ....... 429/218.1 |
| 6,350,532 B1 | * | 2/2002 | Davisson et al. ........... 148/416 |

OTHER PUBLICATIONS

Brooke Schumm, Jr. "Aluminum Perchlorate in Aluminum–$MnO_2$ Dry Cells", Journal of the Electrochemical Society, vol. 123, No. 11, Nov. 1976, pp. 1696–1698.

* cited by examiner

Primary Examiner—Carol Chaney
Assistant Examiner—Dah-Wei D. Yuan
(74) Attorney, Agent, or Firm—Oblon, Spivak, McClelland, Maier & Neustadt, P.C.

(57) ABSTRACT

There is provided an aluminum battery which comprises a positive electrode, a negative electrode containing at least one kind of active material selected from the group consisting of aluminum metal and aluminum alloys, and an electrolyte containing a halogen ion and at least one kind of ion selected from the group consisting of sulfate ion ($SO_4^{2-}$) and nitrate ion ($NO_3^-$).

30 Claims, 1 Drawing Sheet

ALUMINUM BATTERY WITH ALUMINUM-CONTAINING NEGATIVE ELECTRODE

CROSS-REFERENCE TO RELATED APPLICATIONS

This application is based upon and claims the benefit of priority from the prior Japanese Patent Application No. 2000-056454, filed Mar. 1, 2000, the entire contents of which are incorporated herein by reference.

BACKGROUND OF THE INVENTION

This invention relates to a primary battery provided with a negative electrode containing aluminum, an aluminum alloy or a mixture of aluminum and an aluminum alloy, and with an electrolyte. In particular, this invention relates to a primary battery which is improved in the electrolyte thereof.

At present, a manganese battery and an alkaline battery are widely employed as a primary battery for portable equipments. These manganese and alkaline batteries are generally comprising a negative electrode consisting of zinc, and a positive electrode containing manganese dioxide, exhibiting an electromotive force of 1.5V. Due to an increasing development of portable equipments, these primary batteries are now demanded to have an enhanced voltage and an enhanced capacity, and, at the same time, to reduce the total weight thereof.

Since it is expected that a primary battery employing aluminum as the negative electrode active material thereof would be capable of enhancing the capacity of battery as compared with a primary battery employing zinc as the negative electrode active material thereof, the aluminum battery has been studied for past many years. For example, U.S. Pat. No. 2,838,591 discloses an aluminum battery provided with a positive electrode containing manganese dioxide, with a negative electrode consisting of aluminum, and with a weakly acidic aqueous solution of aluminum chloride.

This aluminum battery however is accompanied with problems that since the reactivity between the electrolyte and the negative electrode is unsatisfactory, it is impossible to obtain a high voltage, that the self-discharge increases greatly, that the generation of hydrogen increases greatly, and that the capacity of battery is lowered.

BRIEF SUMMARY OF THE INVENTION

Accordingly, an object of the present invention is to provide a primary battery which is capable of realizing a high voltage and a large capacity, and capable of minimizing the weight of the battery.

Namely, according to the present invention, there is provided a first aluminum battery comprising:
a positive electrode;
a negative electrode containing at least one kind of active material selected from the group consisting of aluminum metal and aluminum alloys; and
an electrolyte containing a halogen ion and at least one kind of ion selected from the group consisting of sulfate ion ($SO_4^{2-}$) and nitrate ion ($NO_3^-$).

According to the present invention, there is also provided a second aluminum battery comprising:
a positive electrode;
a negative electrode containing at least one kind of active material selected from the group consisting of aluminum metal and aluminum alloys; and
an electrolyte containing a halogen ion, aluminum ion and at least one kind of ion selected from the group consisting of sulfate ion ($SO_4^{2-}$) and nitrate ion ($NO_3^-$).

According to the present invention, there is also provided a third aluminum battery comprising:
a positive electrode comprising a collector and a positive electrode mixture provided at the collector, the collector containing at least one kind of conductive component selected from the group consisting of tungsten (W), molybdenum (Mo), lead (Pb), titanium nitride and a carbonaceous material;
a negative electrode containing at least one kind of active material selected from the group consisting of aluminum metal and aluminum alloys; and
an electrolyte containing a halogen ion and at least one kind of ion selected from the group consisting of sulfate ion ($SO_4^{2-}$) and nitrate ion ($NO_3^-$).

According to the present invention, there is also provided a fourth aluminum battery comprising:
a positive electrode comprising a collector and a positive electrode mixture provided at the collector, the collector containing at least one kind of conductive component selected from the group consisting of tungsten (W), molybdenum (Mo), lead (Pb) and titanium nitride;
a negative electrode containing at least one kind of active material selected from the group consisting of aluminum metal and aluminum alloys; and
an electrolyte containing a halogen ion and at least one kind of ion selected from the group consisting of sulfate ion ($SO_4^{2-}$) and nitrate ion ($NO_3^-$).

According to the present invention, there is also provided a fifth aluminum battery comprising:
a positive electrode comprising a collector and a positive electrode mixture provided at the collector, the collector containing carbonaceous material;
a negative electrode containing at least one kind of active material selected from the group consisting of aluminum metal and aluminum alloys; and
an electrolyte containing a halogen ion and at least one kind of ion selected from the group consisting of sulfate ion ($SO_4^{2-}$) and nitrate ion ($NO_3^-$).

According to the present invention, there is also provided a sixth aluminum battery comprising:
a positive electrode comprising a collector and a positive electrode mixture provided at the collector, the collector containing at least one kind of conductive component selected from the group consisting of tungsten (W), molybdenum (Mo), lead (Pb), titanium nitride and a carbonaceous material;
a negative electrode containing at least one kind of active material selected from the group consisting of aluminum metal and aluminum alloys; and
an electrolyte containing a halogen ion, aluminum ion and at least one kind of ion selected from the group consisting of sulfate ion ($SO_4^{2-}$) and nitrate ion ($NO_3^-$).

According to the present invention, there is also provided a seventh aluminum battery comprising:
a positive electrode comprising a collector and a positive electrode mixture provided at the collector, the collector containing at least one kind of conductive component selected from the group consisting of tungsten (W), molybdenum (Mo), lead (Pb) and titanium nitride;
a negative electrode containing at least one kind of active material selected from the group consisting of aluminum metal and aluminum alloys; and
an electrolyte containing a halogen ion, aluminum ion and at least one kind of ion selected from the group consisting of sulfate ion ($SO_4^{2-}$) and nitrate ion ($NO_3^-$).

According to the present invention, there is also an eighth aluminum battery comprising:
a positive electrode comprising a collector and a positive electrode mixture provided at the collector, the collector containing carbonaceous material;
a negative electrode containing at least one kind of active material selected from the group consisting of aluminum metal and aluminum alloys; and
an electrolyte containing a halogen ion, aluminum ion and at least one kind of ion selected from the group consisting of sulfate ion ($SO_4^{2-}$) and nitrate ion ($NO_3^-$).

According to the present invention, there is also provided a ninth aluminum battery comprising:
a case containing a resin material forming at least the inner surface;
a positive electrode provided in the case;
a negative electrode provided in the case, containing at least one kind of active material selected from the group consisting of aluminum metal and aluminum alloys; and
an electrolyte provided in the case, containing a halogen ion and at least one kind of ion selected from the group consisting of sulfate ion ($SO_4^{2-}$) and nitrate ion ($NO_3^-$).

According to the present invention, there is also provided a tenth aluminum battery comprising:
a case containing a resin material forming at least the inner surface;
a positive electrode container provided in the case and acting as a positive electrode collector;
a positive electrode mixture provided in the positive electrode container;
a separator provided on the positive electrode mixture;
a negative electrode provided on the separator, containing at least one kind of active material selected from the group consisting of aluminum metal and aluminum alloys; and
an electrolyte impregnated into the separator, containing a halogen ion and at least one kind of ion selected from the group consisting of sulfate ion ($SO_4^{2-}$) and nitrate ion ($NO_3^-$).

According to the present invention, there is also provided an eleventh aluminum battery comprising:
a case containing a resin material forming at least the inner surface;
a positive electrode provided in the case;
a negative electrode provided in the case, containing at least one kind of active material selected from the group consisting of aluminum metal and aluminum alloys; and
an electrolyte provided in the case, containing a halogen ion, aluminum ion and at least one kind of ion selected from the group consisting of sulfate ion ($SO_4^{2-}$) and nitrate ion ($NO_3^-$).

According to the present invention, there is also provided a twelfth aluminum battery comprising:
a case containing a resin material forming at least the inner surface;
a positive electrode container provided in the case and acting as a positive electrode collector;
a positive electrode mixture provided in the positive electrode container;
a separator provided on the positive electrode mixture;
a negative electrode provided on the separator, containing at least one kind of active material selected from the group consisting of aluminum metal and aluminum alloys; and
an electrolyte impregnated into the separator, containing a halogen ion, aluminum ion and at least one kind of ion selected from the group consisting of sulfate ion ($SO_4^{2-}$) and nitrate ion ($NO_3^-$).

DETAILED DESCRIPTION OF THE INVENTION

Figure 1:
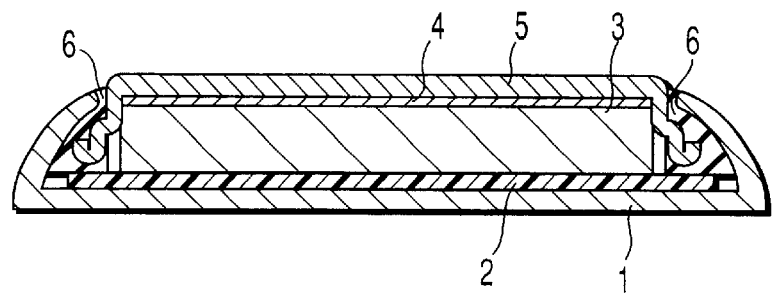
FIG. 1 is a cross-sectional view of a coin type aluminum battery representing one embodiment of the aluminum battery according to this invention.

A first aluminum battery according to this invention comprises:
a positive electrode;
a negative electrode containing at least one kind of active material selected from the group consisting of aluminum metal and aluminum alloys; and
an electrolyte containing a halogen ion and at least one kind of first ion selected from the group consisting of sulfate ion ($SO_4^{2-}$) and nitrate ion ($NO_3^-$).

First of all, a first type (I) of aluminum battery representing one embodiment of this first aluminum battery according to this invention will be explained in details.

This first type (I) of aluminum battery comprises:
a container acting also as a negative electrode and consisting essentially of aluminum or an aluminum alloy;
a positive electrode housed in the container;
a separator interposed between the container and the positive electrode;
an electrolyte A containing a halogen ion and at least one kind of first ion selected from the group consisting of sulfate ion ($SO_4^{2-}$) and nitrate ion ($NO_3^-$) and retained at least in the separator; and
a sealing member functioning also as a positive electrode terminal and attached via an insulating gasket to an opening portion of the container.

Next, the details of the container functioning also as a negative electrode, and of the aforementioned positive electrode and separator will be explained.

(1) Container Functioning Also as a Negative Electrode:

The purity of aluminum metal should preferably be 99.5% or more. Because if the purity of aluminum metal is less than 99.5%, the container is more likely to be corroded by the electrolyte, thus possibly leading to the pitting of the container. More preferably, the purity of aluminum metal should be 99.9% or more.

The aluminum metal may contain at least one kind of transition metal element selected from the group consisting of Fe, Ni and Cu. However, the content of each of these transition metal elements in the aluminum metal should preferably be confined within the range of 0 to 500 ppm. For example, if the aluminum metal contains all of Fe, Ni and Cu, the content of Fe should preferably be confined to not more than 500 ppm, the content of Ni should preferably be confined to not more than 500 ppm, and the content of Cu should preferably be confined to not more than 500 ppm. When the content of each of these transition metal elements in the aluminum metal exceeds over the aforementioned limitation of 500 ppm, the corrosion of the negative electrode would be proceeded, thereby accelerating the progress of self-discharge, thus possibly lowering the capacity of battery. Therefore, more preferable range of these impurities in the aluminum metal would be within the range of 0 to 100 ppm for each kind of these transition metals.

As for examples of the aluminum alloy, they may be any kind of alloys containing Al and at least one kind of element selected from the group consisting of Mn, Cr, Sn, Ca, Mg, Pb, Si, In and Zn. Among them, an alloy containing Al and Zn, and an alloy containing Al, Mg and Cr are most preferable.

The aluminum alloy may contain at least one kind of transition metal element selected from the group consisting of Fe, Ni and Cu. However, the content of each of these transition metal elements in the aluminum alloy should preferably be confined within the range of 0 to 500 ppm. For example, if the aluminum alloy contains Fe and Cu, the content of Fe should preferably be confined to not more than 500 ppm and at the same time, the content of Cu should preferably be confined to not more than 500 ppm. When the content of each of these transition metal elements in the aluminum alloy exceeds over the aforementioned limitation of 500 ppm, the corrosion of the negative electrode would be proceeded, thereby accelerating the progress of self-discharge, thus possibly lowering the capacity of battery. Therefore, more preferable range of these impurities in the aluminum alloy would be within the range of 0 to 100 ppm for each kind of these transition metals.

The quantity of these impurities in the aluminum metal and in the aluminum alloy can be measured respectively by means of ICP mass spectrometry (inductively coupled plasma mass spectrometry) or ICP emission spectrometry (inductively coupled plasma atomic emission spectrometry).

(2) Positive Electrode:

This positive electrode includes a positive electrode mixture containing an active material, and a positive electrode collector which is electrically contacted with this positive electrode mixture.

As for the active material for the positive electrode, it is possible to employ metal oxides, metal sulfides, conductive polymers, etc. As for the metal oxides, it is possible to employ manganese dioxide ($MnO_2$), lead dioxide ($PbO_2$), nickel hydroxide {NiOOH or $Ni(OH)_2$}, silver oxide ($Ag_2O$), and iron oxides such as FeO, $Fe_2O_3$ and $FeO_x$ (x is more than 1.5). The examples of metal sulfides include iron sulfide, nickel sulfide, etc. As for the conductive polymers, it is possible to employ polyaniline, polypyrrole, organosulfur compounds such as disulfide compound and sulfur. Among these active materials, electrolytic manganese dioxide is most preferable.

It is desirable for the aforementioned positive electrode mixture to further contain a conductive agent, examples of which include graphite, acetylene black and carbon black. In this case, the content of the conductive agent in the positive electrode mixture should preferably be confined within the range of 5 to 20% by weight.

This positive electrode mixture can be manufactured by a procedure wherein an active substrate, a conductive agent and a binder are mixed together, and then, compression-molded into a pellet-like configuration.

As for the binder, it is possible to employ polytetrafluoroethylene.

The positive electrode collector should preferably consist essentially of either a sheet containing at least one kind of conductive component selected from the group consisting of tungsten (W), molybdenum (Mo), lead (Pb) and titanium nitride (TiN), or a sheet containing a carbonaceous material. This sheet can be a porous sheet or a non-porous sheet. In the case of the sheet where two or more kinds of conductive component selected from the group consisting of tungsten (W), molybdenum (Mo) and lead (Pb) are incorporated therein, each of the conductive components can be existed therein in the form of simple metallic state, or alternatively, an alloy containing two or more kinds of conductive component selected from the group consisting of tungsten, molybdenum and lead can be incorporated in the sheet.

As for the positive electrode collector containing titanium nitride (TiN), it is possible to employ a metal sheet such as a nickel sheet on which titanium nitride is coated or plated, or a sheet of titanium nitride. Particularly preferable examples of the positive electrode collector are sheets containing at least one kind of metal selected from the group consisting of tungsten (W) and molybdenum (Mo), and sheets containing a carbonaceous material.

In the cases where the positive electrode collector contains at least one kind of conductive component selected from the group consisting of tungsten (W), molybdenum (Mo), lead (Pb) and titanium nitride (TiN), the content of the conductive component in the positive electrode collector should preferably be 99% by weight or more, more preferably, 99.9% by weight or more.

The positive electrode collector containing a carbonaceous material can be manufactured by a procedure wherein a powdery carbonaceous material and a binder are mixed together, and then, compression-molded into a sheet.

The thickness of the positive electrode collector should preferably be confined within the range of 10 to 200 µm.

As for the powdery carbonaceous material, it is possible to employ graphite or carbon fiber.

The content of the carbonaceous material in the positive electrode collector should preferably be 80% by weight or more, more preferably, 90% by weight or more.

(3) Separator:

As for the separator, it is possible to employ kraft paper, a sheet of synthetic fiber, a sheet of natural fiber, a nonwoven fabric, a sheet of glass fiber, a porous film of polyolefin.

The thickness of the separator should preferably be confined within the range of 10 to 200 µm.

Next, a second type (II) of aluminum battery representing another embodiment of this first aluminum battery according to this invention will be explained in details.

This second type (II) of aluminum battery comprises:

a negative electrode containing at least one kind of active material selected from the group consisting of aluminum metal and aluminum alloys;

a positive electrode arranged around the negative electrode;

a separator arranged between the negative electrode and the positive electrode;

an electrolyte A containing a halogen ion and at least one kind of first ion selected from the group consisting of sulfate ion ($SO_4^{2-}$) and nitrate ion ($NO_3^-$) and retained at least in the separator; and a case housing therein a power-generating element provided with the negative electrode, the positive electrode, the separator and the electrolyte A, at least the inner surface of the case being constituted by a resin.

As for the materials for the positive electrode and the separator, the same kinds of materials as explained with reference to the first type (I) of aluminum battery can be employed. Therefore, the details of the negative electrode and the case will be explained below.

(4) Negative Electrode:

This negative electrode includes not only a negative electrode gel containing a powdery active material selected from aluminum metal powder and aluminum alloy powder, a thickener, and the electrolyte A, but also a collector to be contact with at least a portion of the negative electrode gel.

The purity of aluminum metal should preferably be 99.5% or more. Because if the purity of aluminum metal is less than 99.5%, the negative electrode is more likely to be corroded by the electrolyte, thus possibly accelerating the self-discharge of the negative electrode. More preferably, the purity of aluminum metal should be 99.9% or more.

The aluminum metal may contain at least one kind of transition metal element selected from the group consisting of Fe, Ni and Cu. However, the content of each of these transition metal elements in the aluminum metal should preferably be confined within the range of 0 to 500 ppm. When the content of each of these transition metal elements in the aluminum metal exceeds over the aforementioned limitation of 500 ppm, the corrosion of the negative electrode would be proceeded, thereby accelerating the progress of self-discharge, thus possibly lowering the capacity of battery. Therefore, more preferable range of these impurities in the aluminum metal would be within the range of 0 to 100 ppm for each kind of these transition metal elements.

As for examples of the aluminum alloy, they may be any kind of alloys containing Al and at least one kind of element selected from the group consisting of Mn, Cr, Sn, Ca, Mg, Pb, Si, In and Zn. Among them, an alloy containing Al and Zn, and an alloy containing Al, Mg and Cr are most preferable.

The aluminum alloy may contain at least one kind of transition metal element selected from the group consisting of Fe, Ni and Cu. However, the content of each of these transition metal elements in the aluminum alloy should preferably be confined within the range of 0 to 500 ppm. When the content of each of these transition metal elements in the aluminum alloy exceeds over the aforementioned limitation of 500 ppm, the corrosion of the negative electrode would be proceeded, thereby accelerating the progress of self-discharge, thus possibly lowering the capacity of battery. Therefore, more preferable range of these impurities in the aluminum alloy would be within the range of 0 to 100 ppm for each kind of these transition metals.

The quantity of these impurities in the aluminum metal and in the aluminum alloy can be measured respectively by means of ICP mass spectrometry (inductively coupled plasma mass spectrometry) or ICP emission spectrometry (inductively coupled plasma atomic emission spectrometry).

The average particle diameter of the powdery active material should preferably be confined within the range of 0.01 to 3 mm.

As for the thickener, it is possible to employ carboxymethyl cellulose, starch and silicic anhydride ($SiO_2$).

The collector can be formed of a material selected from stainless steel, nickel and carbonaceous material.

(5) Case:

The case can be formed using only a resin or using a multi-layer sheet comprising a resin layer and a metal layer.

As for the resin material for forming at least the inner surface of the case, it is preferable to employ at least one kind of resin selected from the group consisting of polyolefin resin, acrylonitrile/styrene (AS) resin, acrylonitrile/butadiene/styrene (ABS) resin and ethylene/propylene copolymer. Among these resins, polyolefin resin is most preferable.

The thickness of the case should preferably be confined to not more than 0.5 mm.

Next, the details on the electrolyte A to be employed in the aforementioned aluminum batteries of first type (I) and second type (II) will be explained.

(6) Electrolyte A:

The electrolyte A is free from aluminum ion at least until it is incorporated into the battery. However, once the electrolyte A is incorporated into the battery and the discharging of battery is initiated, the negative electrode is caused to dissolve slightly in the electrolyte A, thereby enabling aluminum ion to enter into the electrolyte A. Thus, the concentration of aluminum ion in the electrolyte increases together with the progress of the discharging. Further, even before the initiation of this discharging, the negative electrode may be caused to dissolve in the electrolyte A due to the self-discharge thereof, thereby allowing aluminum ion to enter into the electrolyte A. The concentration of aluminum ion in the electrolyte A of the aluminum battery would be less than 0.01 M/L before or after the discharging.

The aluminum ion can be existed in the electrolyte in a state of $Al(H_2O)_6^{3+}$ where the aluminum ion is solvated with water molecule, or as aluminum complex ion such as $Al_6(OH)_{15}^{3+}$ and $Al(OH)_4^-$.

The concentration of aluminum ion herein means not the concentration of the hydrated ion of aluminum nor the concentration of the complex ion of aluminum, but the concentration which is calculated based on the aluminum atom.

(A) First Ion:

The first ion is at least one kind of ion selected from the group consisting of sulfate ion ($SO_4^{2-}$) and nitrate ion ($NO_3^-$). Thus, both of these sulfate ion and nitrate ion can be concurrently employed for this first ion.

The concentration of the first ion should preferably be confined within the range of 0.05 to 10 M/L because of the following reasons. Namely, if the concentration of the first ion is less than 0.05 M/L, not only the electric conductivity of the electrolyte may become too small, but also the formation of film on the surface of the negative electrode may become insufficient, thereby possibly accelerating the progress of self-discharge. On the other hand, if the concentration of the first ion is more than 10 M/L, the growth of film on the surface of the negative electrode may become too prominent, thereby increasing the interface resistance of the negative electrode, thus making it impossible to realize a high voltage of battery. Therefore, the concentration of the first ion should more preferably be in the range of from 0.2 to 10 M/L, most preferably in the range of from 0.5 to 5 M/L.

As for the salts which are capable of providing the sulfate ion, it is possible to employ sulfuric acid, aluminum sulfate, sodium sulfate, ammonium sulfate, etc.

As for the salts which are capable of providing the nitrate ion, it is possible to employ nitric acid, aluminum nitrate, sodium nitrate, ammonium nitrate, etc.

(B) Halogen Ion:

As for the halogen ion, it is possible to employ at least one kind of ion selected from the group consisting of fluorine ion ($F^-$), chlorine ion ($Cl^-$), bromine ion ($Br^-$), iodine ion ($I^-$). Among them, the halogen ion constituted by at least one kind of ion selected from the group consisting of chlorine ion, bromine ion and iodine ion is more preferable. Most preferable halogen ion is chlorine ion.

The concentration of the halogen ion in the electrolyte should preferably be confined within the range of 0.01 to 6 M/L because of the following reasons. Namely, if the concentration of the halogen ion is less than 0.01 M/L, not only the electric conductivity of the electrolyte may become too small, but also the solubility of the film formed on the surface of the negative electrode may be reduced, thereby possibly allowing a relatively thick film to be left remained on the surface of the negative electrode, thus making it impossible to realize a high voltage of battery. On the other hand, if the concentration of the halogen ion is more than 6 M/L, the pitting of the negative electrode container or the corrosion of the negative electrode may become prominent, thereby accelerating the progress of self-discharge. Therefore, more preferable range of the concentration of the halogen ion is from 0.05 to 1 M/L.

As for the salts which are capable of providing the halogen ion, it is possible to employ aluminum halide and alkali halide.

(C) Ammonium Ion:

Preferably, the electrolyte A should further comprise one or more kinds of ammonium ion. The ammonium ion herein means a cation having a skeleton represented by the following chemical formula (1). Specific examples of the ammonium ion are $NH_4^+$, $(CH_3)_4N^+$, $(C_2H_5)_4N^+$, etc.

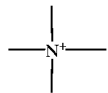

The concentration of the ammonium ion in the electrolyte should preferably be confined within the range of 0.01 to 6 M/L. Namely, when the concentration of the ammonium ion is confined within the aforementioned range, the polarization of the positive electrode can be extremely inhibited, thereby making it possible to improve the utilization of the positive electrode and hence to enhance the capacity of the battery as well as to maintain the high voltage for a long period. Therefore, more preferable range of the concentration of the ammonium ion is from 0.01 to 2 M/L.

As for the salts which are capable of providing the ammonium ion, it is possible to employ ammonium sulfate, ammonium chloride, tetraethyl ammonium chloride and tetramethyl ammonium chloride.

Preferably, the electrolyte A should further comprise one or more kinds of alkali metal ion. Preferably, at least one kind of alkali metal ion selected from $Li^+$, $Na^+$ and $K^+$ should be incorporated in the electrolyte A. When one or more alkali metal ions are further incorporated into an electrolyte containing the aforementioned first ion and halogen ion, the reaction at the positive electrode can be promoted, thereby improving the battery capacity and the battery voltage.

The pH of the electrolyte A should preferably be confined within the range of −2 to 3 because of the following reasons. Namely, if the pH of the electrolyte A is less than −2, the negative electrode may be more likely to be corroded by the electrolyte, thereby accelerating the progress of the self-discharge of battery. On the other hand, if the pH of the electrolyte A is more than 3, the electric conductivity of the electrolyte would be deteriorated, thus making it difficult to realize a high capacity and a high voltage of the battery. Therefore, more preferable range of the pH of the electrolyte A would be from −1.5 to 1.

This electrolyte A can be prepared by dissolving an aimed salt or aimed salts in water, and hence, this electrolyte A is liquid. It is possible to employ, instead of the liquid electrolyte A, a gel electrolyte containing the electrolyte A. This gel electrolyte can be prepared by mixing silicic anhydride ($SiO_2$) or a polymer material such carboxymethyl cellulose or starch with the electrolyte A.

Next, a second aluminum battery according to this invention will be explained.

This second aluminum battery comprises:
a positive electrode;
a negative electrode containing at least one kind of active material selected from the group consisting of aluminum metal and aluminum alloys; and
an electrolyte B containing a halogen ion, aluminum ion and at least one kind of first ion selected from the group consisting of sulfate ion ($SO_4^{2-}$) and nitrate ion ($NO_3^-$).

Three kinds of state as explained hereinafter are stipulated in this second aluminum battery.

(1) A state where the electromotive force in the aforementioned first aluminum battery is 1.7V or more.

(2) A state where the electromotive force in the aforementioned first aluminum battery is less than 1.7V due to the discharging in the aforementioned first aluminum battery. This discharging can be performed by any desired methods such as intermittent discharging, continuous discharging, heavy load discharging, medium load discharging, light load discharging, etc. Further, this discharging can be a partial discharging or a complete discharging, irrespective of the magnitude of discharging.

(3) A battery wherein aluminum ion is existed in the electrolyte prior to the assembling of the battery.

Next, aluminum batteries of third type (III) and fourth type (IV) which meet the aforementioned condition (3) will be explained.

The third type (III) of aluminum battery according to this invention comprises:
a container functioning also as a negative electrode and consisting essentially of aluminum metal or an aluminum alloy;
a positive electrode housed in the container;
a separator arranged between the container and the positive electrode;
an electrolyte B containing a halogen ion, aluminum ion and at least one kind of first ion selected from the group consisting of sulfate ion ($SO_4^{2-}$) and nitrate ion ($NO_3^-$) and retained at least in the separator; and
a sealing member functioning also as a positive electrode terminal and attached via an insulating gasket to an opening portion of the container.

As for the container functioning also as a negative electrode, the positive electrode and separator, the same kinds of materials as explained with reference to the aforementioned first aluminum battery can be employed.

Next, the fourth type (IV) of aluminum battery according to this invention will be explained.

This fourth type (IV) of aluminum battery comprises:
a negative electrode containing at least one kind of active material selected from the group consisting of aluminum metal and aluminum alloys;
a positive electrode arranged around the negative electrode;
a separator arranged between the negative electrode and the positive electrode;
an electrolyte B containing a halogen ion, aluminum ion and at least one kind of first ion selected from the group consisting of sulfate ion ($SO_4^{2-}$) and nitrate ion ($NO_3^-$) and retained at least in the separator; and
a case housing therein a power-generating element provided with the negative electrode, the positive electrode, the separator and the electrolyte B, the inner wall of the case being constituted by a resin.

As for the materials for the positive electrode and the separator, the same kinds of materials as explained with reference to the first type (I) of aluminum battery can be employed. Further, as for the case, it can be constituted by the same components as explained with reference to the second type (II) aluminum battery. Furthermore, as for the negative electrode, it can be constituted by the same components as explained with reference to the second type (II) aluminum battery except that the electrolyte B is substituted for the electrolyte A.

Next, the details on the electrolyte B to be employed in the aluminum batteries of third type (III) and fourth type (IV) will be explained.

(7) Electrolyte B:

The electrolyte B contains aluminum ion before it is incorporated into the battery.

(a) Aluminum Ion:

The aluminum ion can be existed in the electrolyte in a state of $Al(H_2O)_6^{3+}$ where the aluminum ion is hydrated, or as aluminum complex ion such as $Al_6(OH)_{15}^{3+}$ and $Al(OH)_4^-$.

The concentration of the aluminum ion should preferably be confined within the range of 0.01 to 2 M/L. Since it becomes possible to generate a common-ion effect due to the presence aluminum ion in the electrolyte, it becomes possible to further suppress the corrosion of the negative electrode by the electrolyte. If the concentration of the aluminum ion is less than 0.01 M/L, it would become difficult to generate the common-ion effect. On the other hand, if the concentration of the aluminum ion exceeds over 2 M/L, the electric conductivity of the electrolyte would be deteriorated, thus making it difficult to realize a high capacity and a high voltage of the battery. Therefore, more preferable range of the aluminum ion would be from 0.1 to 1 M/L.

The concentration of aluminum ion herein means not the concentration of the hydrated ion of aluminum nor the concentration of the complex ion of aluminum, but the concentration which is calculated based on the aluminum atom.

As for the salts which are capable of providing the aluminum ion, it is possible to employ aluminum halide for instance.

(b) First Ion:

The first ion is at least one kind of ion selected from the group consisting of sulfate ion ($SO_4^{2-}$) and nitrate ion ($NO_3^-$). Thus, both of these sulfate ion and nitrate ion can be concurrently employed for this first ion.

The concentration of the first ion should preferably be confined within the range of 0.05 to 10 M/L because of the aforementioned reasons. Likewise, more preferable range of the concentration of the first ion is from 0.2 to 10 M/L, most preferably in the range of from 0.5 to 5 M/L.

As for the salts which are capable of providing the sulfate ion or nitrate ion, it is possible to employ the same kinds of materials as explained with reference to the aforementioned electrolyte A.

(c) Halogen Ion:

As for the halogen ion, it is possible to employ at least one kind of ion selected from the group consisting of fluorine ion ($F^-$), chlorine ion ($Cl^-$), bromine ion ($Br^-$) and iodine ion ($I^-$). Among them, the halogen ion constituted by at least one kind of ion selected from the group consisting of chlorine ion, bromine ion and iodine ion is more preferable. Most preferable halogen ion is chlorine ion.

The concentration of the halogen ion in the electrolyte should preferably be confined within the range of 0.01 to 6 M/L because of the aforementioned reasons. Likewise, more preferable range of the concentration of the halogen ion is from 0.05 to 1 M/L.

As for the salts which are capable of providing the halogen ion, it is possible to employ the same kinds of materials as explained with reference to the aforementioned electrolyte A.

(d) Ammonium Ion:

Preferably, the electrolyte B should further comprise one or more kinds of ammonium ion. The ammonium ion herein means a cation having a skeleton represented by the aforementioned chemical formula (1). Specific examples of the ammonium ion are the same as explained with reference to the aforementioned electrolyte A.

The concentration of the ammonium ion in the electrolyte should preferably be confined within the range of 0.01 to 6 M/L because of the same reason as explained with reference to the aforementioned electrolyte A. Likewise, more preferable range of the concentration of the ammonium ion is from 0.01 to 2 M/L.

As for the salts which are capable of providing the ammonium ion, it is possible to employ the same kinds of materials as explained with reference to the aforementioned electrolyte A.

Preferably, the electrolyte B should further comprise one or more kinds of alkali metal ion. Preferably, at least one kind of alkali metal ion selected from $Li^+$, $Na^+$ and $K^+$ should be incorporated in the electrolyte B. When one or more alkali metal ions are further incorporated into an electrolyte containing the aforementioned first ion, halogen ion and aluminum ion, the reaction at the positive electrode can be promoted, thereby further improving the battery voltage and the battery capacity.

The pH of the electrolyte B should preferably be confined within the range of −2 to 3 because of the aforementioned reasons. Likewise, more preferable range of the pH of the electrolyte B would be in the range of −1.5 to 1.

This electrolyte B can be prepared by dissolving an aimed salt or aimed salts in water, and hence, this electrolyte B is liquid. It is possible to employ, instead of the liquid electrolyte B, a gel electrolyte containing the electrolyte B. This gel electrolyte can be prepared by mixing silicic anhydride ($SiO_2$) or a polymer material such carboxymethyl cellulose or starch with the electrolyte B.

One example of the aforementioned first type (I) and third type (III) aluminum batteries is illustrated in FIG. 1.

Referring to FIG. 1, a separator 2 is housed inside a bottomed cylindrical container 1 which consists essentially of aluminum metal or aluminum alloy and serves as a negative electrode. A positive electrode mixture 3 having a pellet-like configuration is also housed inside this container-shaped negative electrode 1 in such a manner that it is placed on the separator 2. A disc-shaped positive electrode collector 4 is superimposed on the positive electrode mixture 3. The electrolyte A or electrolyte B is penetrated into the positive electrode mixture 3 and also into the separator 2. A bottomed cylindrical metallic positive electrode sealing member 5 is caulked via an insulating gasket 6 to the container-shaped negative electrode 1.

It is possible, in these first type (I) and third type (III) aluminum batteries, to further incorporate a negative electrode mixture in the container-shaped negative electrode 1. In this case, the negative electrode mixture, the separator, the positive electrode mixture and the positive electrode collector 4 are placed in the mentioned order inside the container-shaped negative electrode 1. This negative electrode mixture can be manufactured by a procedure wherein at least one kind of powder selected from aluminum metal powder and aluminum alloy powder is compression-molded into a pellet-like configuration. As for the aluminum metal and aluminum alloy, it is possible to employ the same materials as explained in the aforementioned item (1) directed to the container functioning as the negative electrode. The average particle diameter of the aluminum metal powder and aluminum alloy powder should preferably be confined to the range of 0.01 to 3 mm. It is possible, in this aluminum battery provided with these container-shaped negative electrode and negative electrode mixture, to employ both of aluminum metal and aluminum alloy as the negative electrode active material.

Figure 2:
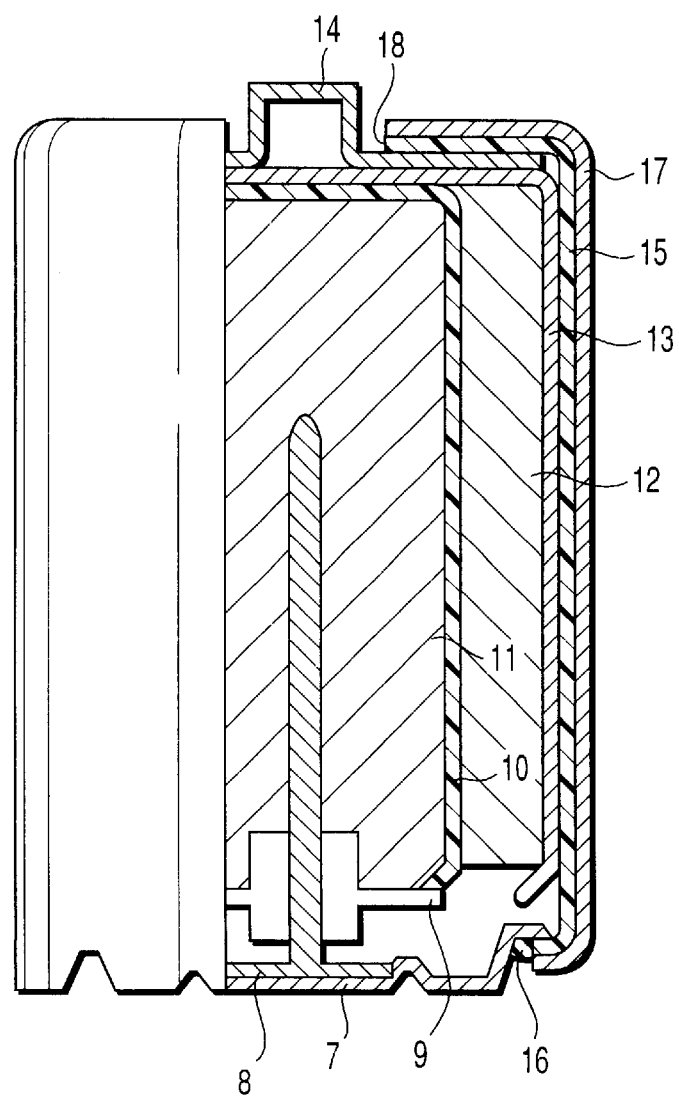
FIG. 2 is a partial cross-sectional view of a cylindrical aluminum battery representing another embodiment of the aluminum battery according to this invention.

One example of the aforementioned second type (II) and fourth type (IV) aluminum batteries is illustrated in FIG. 2.

The aluminum battery constructed as shown in FIG. 2 comprises of a power generating element having a positive electrode, a negative electrode, a separator and an electrolyte; and a hermetically sealed container for housing the power generating element. This hermetically sealed container includes a case 15, and a bottom plate 7 serving as a negative electrode terminal and an adhesive insulating material 16 arranged between the bottom plate 7 and the case 15.

To the bottom plate 7 is attached through welding a rod-shaped negative electrode collector 8. A negative electrode sealing plate 9 is fitted on a lower portion of the negative electrode collector 8. A separator 10 having a bottomed cylindrical configuration is arranged on the sealing plate 9 so as to surround the negative electrode collector 8. The space formed between the separator 10 and the sealing plate 9 is filled with a negative electrode gel 11. A positive electrode mixture 12 having a cylindrical configuration is arranged along the outer surface of the separator 10. A positive electrode container 13 having a bottomed cylindrical configuration and serving as positive electrode collector is arranged so as to cover the top surface of the separator 10, as well as the top surface and outer surface of the positive electrode mixture 12. All of the negative electrode gel 11, the separator 10 and the positive electrode mixture 12 are impregnated with the electrolyte A or the electrolyte B.

A hat-shaped positive terminal 14 is arranged on the top surface of the positive electrode container 13. The case 15 having a bottomed cylindrical configuration with the edge portions thereof being bent inwardly and having a hole 18 in the bottom portion is arranged to the positive electrode container 13 in such manners that it covers the side of the positive electrode container 13, that the bottom portion thereof is adhered to the peripheral portion of the positive terminal 14 by an adhesive insulating material, and that the inwardly bent portion thereof is adhered to the peripheral portion of the bottom plate 7 by an adhesive insulating material 16. As for this adhesive insulating material, it is possible to employ tar, pitch, etc. The case 15 contains a resin material forming at least the inner surface thereof. An outer packaging tube 17 made of a metal foil for instance covers the case 15.

The aluminum battery of this invention which is constructed as explained above comprises:

a positive electrode;

a negative electrode containing at least one kind of active material selected from the group consisting of aluminum metal and aluminum alloys; and an electrolyte containing a halogen ion, and at least one kind of first ion selected from the group consisting of sulfate ion ($SO_4^{2-}$) and nitrate ion ($NO_3^-$).

According to this aluminum battery, it is possible to improve the electromotive force and capacity of the battery. Furthermore, since this battery is provided with a light-weight negative electrode containing aluminum metal or an aluminum alloy, it is possible to reduce the weight of battery as compared with a battery using zinc as the negative electrode thereof.

Namely, it has been found as a result of intensive study made by the present inventor that if at least one kind of first ion selected from the group consisting of sulfate ion ($SO_4^{2-}$) and nitrate ion ($NO_3^-$) is incorporated into an electrolyte containing a halogen ion, the electric conductivity of the electrolyte can be improved, and at the same time, a protective layer containing $Al_2O_3$ can be sufficiently formed on the surface of the negative electrode, thereby making it possible to suppress the corrosion of negative electrode, i.e. the self-discharging. Additionally, it has been found that in the case of the electrolyte containing not only the first ion but also a halogen ion, since the protective layer is suitably destroyed by the halogen ion, the thickness and denseness of the protective layer can be optimized, thereby enabling the negative electrode to perform a smooth discharging. Although it is not yet made clear about the mechanism wherein the protective layer is destroyed by the halogen ion, it is assumed that the $Al_2O_3$ in the protective layer is allowed to react with a halogen ion to thereby produce aluminum chloride ($AlCl_3$), which is then hydrolyzed, thus resulting in the dissolution of the protective layer in the electrolyte. Furthermore, as a result of this hydrolysis of the aluminum chloride ion, water molecule ($H_2O$) and a halogen ion are produced, thereby making it possible to maintain enough concentration of the halogen ion as well as enough quantity of water molecule in the electrolyte even after the destructive reaction of the protective layer.

Therefore, it becomes possible, through the employment of an electrolyte containing not only the first ion but also a halogen ion, to obtain the following effects. Namely, (1) since the corrosion of negative electrode, i.e. the self-discharging can be suppressed, the quantity of the generation of hydrogen can be minimized; (2) it is possible to enable the negative electrode to perform a smooth discharging; and (3) the electric conductivity of electrolyte can be improved. As a result of these effects (1) to (3), it is now possible to provide an aluminum battery exhibiting a voltage of as high as 1.5V or more for instance, and at the same time, exhibiting an improved capacity.

When the concentration of the first ion in the electrolyte is the range of 0.05 to 10 M/L, and at the same time, the concentration of the halogen ion in the electrolyte is confined to the range of 0.01 to 6 M/L in the aluminum battery of this invention, the balance between the suppression of self-discharge and the promotion of discharging of the negative electrode can be optimized, thus improving the battery with respect to the voltage and capacity thereof.

Further, when the pH of the electrolyte is the range of −2 to 3 in the aluminum battery of this invention, the electric conductivity of the electrolyte can be enhanced, and at the same time, the balance between the suppression of self-discharge and the promotion of discharging of the negative electrode can be optimized, thus making it possible to further improve the battery with respect to the voltage and capacity thereof.

Further, when ammonium ion is further incorporated into the electrolyte in the aluminum battery of this invention, it becomes possible to further improve the battery with respect to the voltage and capacity thereof.

As for the positive electrode of the aluminum battery of this invention, the positive electrode can have a positive electrode mixture, and a positive electrode collector which is contacted with at least a part of this positive electrode mixture. When this positive electrode collector contains at least one kind of conductive component selected from the group consisting of tungsten (W), molybdenum (Mo), lead (Pb) and titanium nitride, or contains a carbonaceous material, the corrosion of the positive electrode collector by an electrolyte can be inhibited, thereby making it possible to improve the utilization of the positive electrode and hence to further improve the battery with respect to the voltage and capacity thereof.

When the purity of aluminum metal of the negative electrode is not less than 99.5% in the aluminum battery of this invention, it becomes possible to suppress the corrosion of negative electrode, i.e. the self-discharging, thereby making it possible to further improve the battery with respect to the voltage and capacity thereof.

When the aluminum alloy of the negative electrode in the aluminum battery of this invention contains Al and at least one kind of element selected from the group consisting of Mn, Cr, Sn, Ca, Mg, Pb, Si, In and Zn, it becomes possible to suppress the corrosion of negative electrode, i.e. the self-discharging, thereby making it possible to further improve the battery with respect to the voltage and capacity thereof.

When the aluminum metal and aluminum alloy included in the aluminum battery of this invention contains at least one kind of transition metal element selected from the group consisting of Fe, Ni and Cu, the content of each of these transition metal elements in the aluminum metal should preferably be within the range of 0 to 500 ppm, and also the content of each of these transition metal elements in the aluminum alloy should preferably be within the range of 0 to 500 ppm. When the content of each of these transition metal elements in the aluminum metal and in the aluminum alloy is limited as mentioned above, the corrosion of the negative electrode can be further suppressed, thereby making it possible to inhibit the progress of the self-discharge and hence to improve the capacity of the battery.

According to the aluminum battery of this invention, since the case for containing the positive electrode, the negative electrode and the electrolyte includes a resin material forming the inner surface thereof, it becomes possible to prevent the case from being corroded by the electrolyte, so that the battery can be constructed into a cylindrical structure having a higher capacity as compared with the coin type battery. Furthermore, since this case comprising a resin component can be made lighter and thinner as compared with a metallic case, it is now possible to manufacture a primary battery which is relatively small in thickness and relatively light in weight. In particular, it is preferable, for the material of the case, to employ a laminate film having a thickness of 0.5 mm or less, at least one of the outermost layers of which being constituted by a resin layer. In this case, the resin layer of the laminate film is utilized as the inner surface of the case.

The aluminum battery according to another embodiment of this invention comprises:

a positive electrode;

a negative electrode containing at least one kind of active material selected from the group consisting of aluminum metal and aluminum alloys; and an electrolyte containing a halogen ion, aluminum ion, and at least one kind of first ion selected from the group consisting of sulfate ion ($SO_4^{2-}$) and nitrate ion ($NO_3^-$).

According to this aluminum battery, since not only the first ion but also a halogen ion is included in the electrolyte, it becomes possible to obtain the aforementioned effects (1) to (3). Further, since aluminum ion is existed in the electrolyte prior to the assembling of the battery, it becomes possible to generate a common-ion effect, thereby making it possible to enhance, in particular, the effect (1), i.e. the inhibition of the self-discharge. As a result, the voltage and capacity of battery can be further improved, concurrently realizing a light-weight aluminum battery.

When the concentration of the first ion in the electrolyte is the range of 0.05 to 10 M/L, the concentration of the halogen ion in the electrolyte is confined to the range of 0.01 to 6 M/L, and at the same time, the concentration of aluminum ion is confined to the range of 0.01 to 2 M/L in the aluminum battery of this invention, the balance between the suppression of self-discharge and the promotion of discharging of the negative electrode can be optimized, thus improving the battery with respect to the voltage and capacity thereof.

Further, when the pH of the electrolyte is the range of −2 to 3 in the aluminum battery of this invention, the electric conductivity of the electrolyte can be enhanced, and at the same time, the balance between the suppression of self-discharge and the promotion of discharging of the negative electrode can be optimized, thus making it possible to further improve the battery with respect to the voltage and capacity thereof.

Further, when ammonium ion is further incorporated into the electrolyte in the aluminum battery of this invention, it becomes possible to further improve the battery with respect to the voltage and capacity thereof.

As for the positive electrode of the aluminum battery of this invention, the positive electrode can have a positive electrode mixture, and a positive electrode collector which is contacted with at least a part of this positive electrode mixture. When this positive electrode collector contains at least one kind of conductive component selected from the group consisting of tungsten (W), molybdenum (Mo), lead (Pb) and titanium nitride, or contains a carbonaceous material, the corrosion of the positive electrode collector by an electrolyte can be inhibited, thereby making it possible to improve the utilization of the positive electrode and hence to further improve the battery with respect to the voltage and capacity thereof.

When the purity of aluminum metal of the negative electrode is not less than 99.5% in the aluminum battery of this invention, it becomes possible to suppress the corrosion of negative electrode, i.e. the self-discharging, thereby making it possible to further improve the battery with respect to the voltage and capacity thereof.

When the aluminum alloy of the negative electrode in the aluminum battery of this invention contains Al and at least one kind of element selected from the group consisting of Mn, Cr, Sn, Ca, Mg, Pb, Si, In and Zn, it becomes possible to suppress the corrosion of negative electrode, i.e. the self-discharging, thereby making it possible to further improve the battery with respect to the voltage and capacity thereof.

When the aluminum metal and aluminum alloy included in the aluminum battery of this invention contains at least one kind of transition metal element selected from the group consisting of Fe, Ni and Cu, the content of each of these transition metal elements in the aluminum metal should preferably be within the range of 0 to 500 ppm, and also the content of each of these transition metal elements in the aluminum alloy should preferably be within the range of 0 to 500 ppm. When the content of each of these transition metal elements in the aluminum metal and in the aluminum alloy is limited as mentioned above, the corrosion of the negative electrode can be further suppressed, thereby making it possible to inhibit the progress of the self-discharge and hence to improve the capacity of the battery.

According to the aluminum battery of this invention, when the material of the case for containing the positive electrode, the negative electrode and the electrolyte includes a resin material for forming at least the inner surface thereof, it becomes possible to prevent the case from being corroded by the electrolyte, so that the battery can be constructed into a cylindrical structure having a higher capacity as compared with the coin type battery. Furthermore, since this case comprising a resin component can be made lighter and thinner as compared with a metallic case, it is now possible to manufacture a primary battery which is relatively small in thickness and relatively light in weight.

Next, the examples of this invention will be explained in detail with reference to the afore-mentioned drawings.

EXAMPLE 1

Manufacture of the Positive Electrode

As a positive electrode active material, electrolytic manganese dioxide ($MnO_2$) was employed. Then, this electrolytic manganese dioxide was mixed with 10% by weight of acetylene black as a conductive agent and 3% by weight of polytetrafluoroethylene as a binder to form a mixture, which is then compression-molded to manufacture a positive electrode pellet.

As for the positive electrode collector, a carbon film having a thickness of 100 μm and formed of carbon fiber was employed.

Preparation of the Electrolyte

Aluminum chloride ($AlCl_3$) and ammonium sulfate $\{(NH_4)_2SO_4\}$ were dissolved in a 2 M/L aqueous solution of sulfuric acid to obtain an electrolyte containing aluminum chloride at a concentration of 0.25 M/L and ammonium sulfate at a concentration of 0.25 M/L. The concentrations of chlorine ion ($Cl^-$), sulfate ion ($SO_4^{2-}$), aluminum ion and ammonium ion ($NH_4^+$) in the electrolyte are shown in the following Table 1.

Assembling of Battery

An aluminum container having a bottomed cylindrical configuration and a wall thickness of 0.3 mm was prepared. It was found through the analysis of the constituent components included in this container by means of ICP emission spectrometry that the purity of aluminum was 99.99%, and that the aluminum contained Fe at a concentration of 30 ppm, Ni at a concentration of 5 ppm, and Cu at a concentration of 10 ppm.

Then, as a separator, a glass fiber sheet having a thickness of 30 μm was placed inside this container, and the positive electrode pellet was arranged on this separator, after which a positive electrode collector was further arranged on the positive electrode pellet. Thereafter, the electrolyte was poured into the container, and then, a bottomed cylindrical metallic positive electrode sealing member was caulked via an insulating gasket to the container, thereby assembling a coin type aluminum battery having a structure as shown in FIG. 1, a diameter of 20 mm and a thickness of 1.6 mm.

EXAMPLE 2

Aluminum chloride and ammonium sulfate were dissolved in a 2 M/L aqueous solution of sulfuric acid to obtain an electrolyte containing aluminum chloride at a concentration of 0.05 M/L and ammonium sulfate at a concentration of 0.05 M/L. The concentrations of chlorine ion ($Cl^-$), sulfate ion ($SO_4^{2-}$), aluminum ion and ammonium ion ($NH_4^+$) in the electrolyte are shown in the following Table 1.

Then, a coin type aluminum battery was assembled in the same manner as explained in Example 1 except that the electrolyte employed in Example 1 was replaced by the aforementioned electrolyte.

EXAMPLE 3

An electrolyte containing Aluminum chloride at a concentration of 2 M/L and ammonium sulfate at a concentration of 0.5 M/L was prepared. The concentrations of chlorine ion ($Cl^-$), sulfate ion ($SO_4^{2-}$), aluminum ion and ammonium ion ($NH_4^+$) in the electrolyte are shown in the following Table 1.

Then, a coin type aluminum battery was assembled in the same manner as explained in Example 1 except that the electrolyte employed in Example 1 was replaced by the aforementioned electrolyte.

EXAMPLE 4

Aluminum sulfate and ammonium sulfate were dissolved in a 1 M/L aqueous solution of hydrochloric acid to obtain an electrolyte containing aluminum sulfate at a concentration of 1 M/L and ammonium sulfate at a concentration of 1 M/L. The concentrations of chlorine ion ($Cl^-$), sulfate ion ($SO_4^{2-}$), aluminum ion and ammonium ion ($NH_4^+$) in the electrolyte are shown in the following Table 1.

Then, a coin type aluminum battery was assembled in the same manner as explained in Example 1 except that the electrolyte employed in Example 1 was replaced by the aforementioned electrolyte.

EXAMPLE 5

Aluminum chloride and ammonium chloride were dissolved in a 2 M/L aqueous solution of sulfuric acid to obtain an electrolyte containing aluminum chloride at a concentration of 0.5 M/L and ammonium chloride at a concentration of 0.5 M/L. The concentrations of chlorine ion ($Cl^-$), sulfate ion ($SO_4^{2-}$), aluminum ion and ammonium ion ($NH_4^+$) in the electrolyte are shown in the following Table 1.

Then, a coin type aluminum battery was assembled in the same manner as explained in Example 1 except that the electrolyte employed in Example 1 was replaced by the aforementioned electrolyte.

EXAMPLE 6

A coin type aluminum battery was assembled in the same manner as explained in Example 1 except that the material for the negative electrode container was changed to an aluminum alloy having the composition explained below.

It was found through the analysis of the constituent components included in this negative electrode container by means of ICP emission spectrometry that the aluminum alloy contained Al, Mg, Cr, Fe, Ni and Cu, wherein the content of Mg was 3.5%, the content of Cr was 0.25%, the content of Fe was 100 ppm, the content of Ni was 5 ppm and the content of Cu was 10 ppm.

EXAMPLES 7 to 13

A coin type aluminum battery was assembled in the same manner as explained in Example 1 except that the concentrations of chlorine ion ($Cl^-$), sulfate ion ($SO_4^{2-}$), aluminum ion and ammonium ion ($NH_4^+$) in the electrolyte were altered as shown in the following Table 1.

EXAMPLE 14

Aluminum chloride was dissolved in a 6 M/L aqueous solution of sulfuric acid to obtain an electrolyte containing aluminum chloride at a concentration of 0.2 M/L. The concentrations of chlorine ion ($Cl^-$), sulfate ion ($SO_4^{2-}$), aluminum ion and ammonium ion ($NH_4^+$) in the electrolyte are shown in the following Table 1.

Then, a coin type aluminum battery was assembled in the same manner as explained in Example 1 except that the electrolyte employed in Example 1 was replaced by the aforementioned electrolyte.

EXAMPLE 15

Potassium chloride (KCl) and ammonium sulfate were dissolved in a 3 M/L aqueous solution of sulfuric acid to obtain an electrolyte containing potassium chloride at a concentration of 0.1 M/L and ammonium sulfate at a concentration of 0.1 M/L. The concentrations of chlorine ion ($Cl^-$), sulfate ion ($SO_4^{2-}$), aluminum ion, ammonium ion ($NH_4^+$) and alkali metal ion in the electrolyte are shown in the following Table 1.

Then, a coin type aluminum battery was assembled in the same manner as explained in Example 1 except that the electrolyte employed in Example 1 was replaced by the aforementioned electrolyte.

EXAMPLE 16

Lithium chloride (LiCl) and ammonium sulfate were dissolved in a 3 M/L aqueous solution of sulfuric acid to obtain an electrolyte containing lithium chloride at a concentration of 0.1 M/L and ammonium sulfate at a concentration of 0.1 M/L. The concentrations of chlorine ion ($Cl^-$), sulfate ion ($SO_4^{2-}$), aluminum ion, ammonium ion ($NH_4^+$) and alkali metal ion in the electrolyte are shown in the following Table 2.

Then, a coin type aluminum battery was assembled in the same manner as explained in Example 1 except that the electrolyte employed in Example 1 was replaced by the aforementioned electrolyte.

EXAMPLE 17

Aluminum bromide ($AlBr_3$) and ammonium sulfate were dissolved in a 2 M/L aqueous solution of sulfuric acid to obtain an electrolyte containing aluminum bromide at a concentration of 0.25 M/L and ammonium sulfate at a concentration of 0.25 M/L. The concentrations of bromine ion ($Br^-$), sulfate ion ($SO_4^{2-}$), aluminum ion and ammonium ion ($NH_4^+$) in the electrolyte are shown in the following Table 2.

Then, a coin type aluminum battery was assembled in the same manner as explained in Example 1 except that the electrolyte employed in Example 1 was replaced by the aforementioned electrolyte.

EXAMPLE 18

Aluminum iodide ($AlI_3$) and ammonium sulfate were dissolved in a 2 M/L aqueous solution of sulfuric acid to obtain an electrolyte containing aluminum iodide at a concentration of 0.25 M/L and ammonium sulfate at a concentration of 0.25 M/L. The concentrations of iodine ion ($I^-$), sulfate ion ($SO_4^{2-}$), aluminum ion and ammonium ion ($NH_4^+$) in the electrolyte are shown in the following Table 2.

Then, a coin type aluminum battery was assembled in the same manner as explained in Example 1 except that the electrolyte employed in Example 1 was replaced by the aforementioned electrolyte.

EXAMPLE 19

A coin type aluminum battery was assembled in the same manner as explained in Example 1 except that a tungsten foil having a purity of 99.9% was employed as the positive electrode collector.

EXAMPLE I

Aluminum chloride was dissolved in a 0.05 M/L aqueous solution of sulfuric acid to obtain an electrolyte containing aluminum chloride at a concentration of 3 M/L. The concentrations of chlorine ion ($Cl^-$), sulfate ion ($SO_4^{2-}$) and aluminum ion in the electrolyte are shown in the following Table 2.

Then, a coin type aluminum battery was assembled in the same manner as explained in Example 1 except that the electrolyte employed in Example 1 was replaced by the aforementioned electrolyte.

EXAMPLE II

Aluminum chloride was dissolved in a 0.1 M/L aqueous solution of sulfuric acid to obtain an electrolyte containing aluminum chloride at a concentration of 2 M/L. The concentrations of chlorine ion ($Cl^-$), sulfate ion ($SO_4^{2-}$) and aluminum ion in the electrolyte are shown in the following Table 2.

Then, a coin type aluminum battery was assembled in the same manner as explained in Example 1 except that the electrolyte employed in Example 1 was replaced by the aforementioned electrolyte.

EXAMPLE III

A coin type aluminum battery was assembled in the same manner as explained in Example 1 except that aluminum having a purity of 99.9999% and containing Fe at a concentration of 5 ppm, Ni at a concentration of 1 ppm, and Cu at a concentration of 5 ppm was employed as the material for the negative electrode container. The constituent components of the aluminum was analyzed by ICP emission spectrometry.

COMPARATIVE EXAMPLE 1

A coin type aluminum battery was assembled in the same manner as explained in Example 1 except that a 2 M/L aqueous solution of sulfuric acid was employed as the electrolyte.

COMPARATIVE EXAMPLE 2

A coin type aluminum battery was assembled in the same manner as explained in Example 1 except that a 0.3 M/L aqueous solution of aluminum chloride was employed as the electrolyte.

COMPARATIVE EXAMPLE 3

A coin type aluminum battery was assembled in the same manner as explained in Example 1 except that a 1 M/L aqueous solution of potassium chloride was employed as the electrolyte.

COMPARATIVE EXAMPLE 4

A coin type aluminum battery was assembled in the same manner as explained in Example 1 except that a 2 M/L aqueous solution of ammonium sulfate was employed as the electrolyte.

COMPARATIVE EXAMPLE 5

A zinc/manganese battery was prepared employing zinc as the negative electrode thereof, and a 1 M/L aqueous solution of zinc chloride as the electrolyte thereof.

A discharge test was performed on the batteries of Examples 1 to 19, I to III, and Comparative Examples 1 to 5, wherein the battery voltage was allowed to decrease down to 0.8V with a current of 10 mA so as to measure the electromotive force and capacity of each of these batteries, the results being shown in the following Tables 3 and 4. The weight of each battery of Examples 1 to 19, I to III, and Comparative Examples 1 to 5 is also shown in the following Tables 3 and 4. Additionally, the pH of the electrolyte of each battery of Examples 1 to 19, I to III, and Comparative Examples 1 to 5 is also shown in the following Tables 1 and 2.

TABLE 1

| | Halogen ion | Conc. of halogen ion (M/L) | Conc. of sulfate ion (M/L) | Conc. of Al ion (M/L) | Conc. of ammonium ion (M/L) | Alkali metal | Conc. of alkali metal ion (M/L) | pH | Negative electrode |
|---|---|---|---|---|---|---|---|---|---|
| Example 1 | Cl⁻ | 0.75 | 2.25 | 0.25 | 0.5 | None | 0 | −0.4 | Al metal |
| Example 2 | Cl⁻ | 0.15 | 2.05 | 0.05 | 0.1 | None | 0 | −0.35 | Al metal |
| Example 3 | Cl⁻ | 6 | 0.5 | 2 | 1 | None | 0 | 1.1 | Al metal |
| Example 4 | Cl⁻ | 1 | 4 | 2 | 2 | None | 0 | 3 | Al metal |
| Example 5 | Cl⁻ | 1.5 | 2 | 0.5 | 0.5 | None | 0 | −0.2 | Al metal |
| Example 6 | Cl⁻ | 0.75 | 2.25 | 0.25 | 0.5 | None | 0 | −0.4 | Al alloy |
| Example 7 | Cl⁻ | 0.01 | 0.5 | 0.0033 | 0.2 | None | 0 | 0.3 | Al metal |
| Example 8 | Cl⁻ | 1.2 | 0.2 | 0.4 | 0.2 | None | 0 | 0.7 | Al metal |
| Example 9 | Cl⁻ | 0.06 | 5 | 0.02 | 0.2 | None | 0 | −0.5 | Al metal |
| Example 10 | Cl⁻ | 0.05 | 10 | 0.0167 | 0.2 | None | 0 | −1 | Al metal |
| Example 11 | Cl⁻ | 0.03 | 4.6 | 0.01 | 0.2 | None | 0 | −0.6 | Al metal |
| Example 12 | Cl⁻ | 0.3 | 2.6 | 0.1 | 0.2 | None | 0 | −0.4 | Al metal |
| Example 13 | Cl⁻ | 3 | 1.6 | 1 | 0.2 | None | 0 | −0.2 | Al metal |
| Example 14 | Cl⁻ | 0.75 | 2.5 | 0.25 | 0 | None | 0 | −0.4 | Al metal |
| Example 15 | Cl⁻ | 0.1 | 3 | 0 | 6 | K⁺ | 0.1 | −0.47 | Al metal |

TABLE 2

| | Halogen ion | Conc. of halogen ion (M/L) | Conc. of sulfate ion (M/L) | Conc. of Al ion (M/L) | Conc. of ammonium ion (M/L) | Alkali metal | Conc. of alkali metal ion (M/L) | pH | Negative electrode |
|---|---|---|---|---|---|---|---|---|---|
| Example 16 | Cl⁻ | 0.1 | 3 | 0 | 6 | Li⁺ | 0.1 | −0.47 | Al metal |
| Example 17 | Br⁻ | 0.75 | 2.25 | 0.25 | 0.5 | None | 0 | −0.35 | Al metal |
| Example 18 | I⁻ | 0.75 | 2.25 | 0.25 | 0.5 | None | 0 | −0.35 | Al metal |
| Example 19 | Cl⁻ | 0.75 | 2.25 | 0.25 | 0.5 | None | 0 | −0.4 | Al metal |
| Example I | Cl⁻ | 6 | 0.05 | 2 | 0 | None | 0 | 0.8 | Al metal |
| Example II | Cl⁻ | 6 | 0.1 | 2 | 0 | None | 0 | −0.1 | Al metal |
| Example III | Cl⁻ | 0.75 | 2.25 | 0.25 | 0.5 | None | 0 | −0.4 | Al metal |
| Comparative example 1 | None | 0 | 2 | 0 | 0 | None | 0 | −0.3 | Al metal |
| Comparative example 2 | Cl⁻ | 0.9 | 0 | 0.3 | 0 | None | 0 | 3.5 | Al metal |
| Comparative example 3 | Cl⁻ | 1 | 0 | 0 | 0 | K⁺ | 1 | 6.5 | Al metal |
| Comparative example 4 | None | 0 | 2 | 0 | 4 | None | 0 | 2.5 | Al metal |
| Comparative example 5 | Cl⁻ | 2 | 0 | 0 | 0 | None | 0 | 4.0 | Zn metal |

TABLE 3

| | Electromotive force (V) | Capacity (mAh) | Battery weight (g) |
|---|---|---|---|
| Example 1 | 1.85 | 200 | 2 |
| Example 2 | 1.75 | 180 | 2 |
| Example 3 | 1.74 | 150 | 2 |
| Example 4 | 1.8 | 150 | 2 |
| Example 5 | 1.9 | 180 | 2 |
| Example 6 | 1.95 | 220 | 2 |
| Example 7 | 1.75 | 130 | 2 |
| Example 8 | 1.80 | 120 | 2 |
| Example 9 | 1.75 | 225 | 2 |
| Example 10 | 1.72 | 230 | 2 |
| Example 11 | 1.75 | 220 | 2 |
| Example 12 | 1.78 | 220 | 2 |
| Example 13 | 1.95 | 200 | 2 |
| Example 14 | 1.88 | 190 | 2 |
| Example 15 | 1.72 | 150 | 2 |

TABLE 4

| | Electromotive force (V) | Capacity (mAh) | Battery weight (g) |
|---|---|---|---|
| Example 16 | 1.72 | 160 | 2 |
| Example 17 | 1.85 | 175 | 2 |
| Example 18 | 1.85 | 160 | 2 |
| Example 19 | 1.85 | 210 | 2.2 |
| Example I | 1.80 | 165 | 2 |
| Example II | 1.82 | 170 | 2 |
| Example III | 1.85 | 240 | 2 |
| Comparative example 1 | 1.7 | 100 | 2 |
| Comparative example 2 | 1.7 | 50 | 2 |
| Comparative example 3 | 1.3 | 5 | 2 |
| Comparative example 4 | 1.5 | 30 | 2 |
| Comparative example 5 | 1.6 | 100 | 3.5 |

As seen from these Tables 1 to 4, the batteries of Examples 1 to 19 and I to III, each of which was provided with an electrolyte containing both halogen ion and sulfate ion, were found improved in terms of the voltage and capacity thereof, and also found possible to decrease the weight of battery.

By contrast, the battery of Comparative Example 1 which was provided with an aqueous solution of sulfuric acid as an electrolyte as well as the battery of Comparative Example 2 which was provided with an aqueous solution of aluminum chloride as an electrolyte were found lower in capacity as compared with the batteries of Examples 1 to 19 and I to III. Further, the battery of Comparative Example 3 which was provided with an aqueous solution of potassium chloride as an electrolyte as well as the battery of Comparative Example 4 which was provided with an aqueous solution of ammonium sulfate as an electrolyte were found lower in voltage and also in capacity as compared with the batteries of Examples 1 to 19 and I to III. On the other hand, the zinc/manganese battery of Comparative Example 5 was found not only lower in voltage and capacity but also heavier in weight as compared with the batteries of Examples 1 to 19 and I to III.

Upon finishing this discharge test, each of batteries of Examples 15 and 16 was disassembled to measure the components of electrolyte thereof. As a result, aluminum ion was found existed in the electrolyte, the concentration of aluminum ion in each of these electrolytes being less than 0.01 M/L.

EXAMPLE 20

Aluminum chloride ($AlCl_3$) and ammonium nitrate ($NH_4NO_3$) were dissolved in a 2 M/L aqueous solution of nitric acid to obtain an electrolyte containing aluminum chloride at a concentration of 0.25 M/L and ammonium nitrate at a concentration of 0.25 M/L. The concentrations of chlorine ion ($Cl^-$), nitrate ion ($NO_3^-$), aluminum ion and ammonium ion ($NH_4^+$) in the electrolyte are shown in the following Table 5.

Then, a coin type aluminum battery was assembled in the same manner as explained in Example 1 except that the electrolyte employed in Example 1 was replaced by the aforementioned electrolyte.

EXAMPLES 21 to 24, and 26 to 32

A coin type aluminum battery was assembled in the same manner as explained in Example 20 except that the concentrations of chlorine ion ($Cl^-$), nitrate ion ($NO_3^-$), aluminum ion and ammonium ion ($NH_4^+$) in the electrolyte were altered as shown in the following Tables 5 and 6.

EXAMPLE 25

A coin type aluminum battery was assembled in the same manner as explained in Example 20 except that the material for the negative electrode container was changed to an aluminum alloy having the composition explained below.

It was found through the analysis of the constituent components included in this negative electrode container by means of ICP emission spectrometry that the aluminum alloy contained Al, Mn, Mg, Fe, Ni and Cu, wherein the content of Mn was 1.2%, the content of Mg was 1.0%, the content of Fe was 50 ppm, the content of Ni was 10 ppm and the content of Cu was 5 ppm.

EXAMPLE 33

Aluminum chloride was dissolved in a 2 M/L aqueous solution of nitric acid to obtain an electrolyte containing aluminum chloride at a concentration of 0.25 M/L. The concentrations of chlorine ion ($Cl^-$), nitrate ion ($NO_3^-$), aluminum ion and ammonium ion ($NH_4^+$) in the electrolyte are shown in the following Table 6.

Then, a coin type aluminum battery was assembled in the same manner as explained in Example 1 except that the electrolyte employed in Example 1 was replaced by the aforementioned electrolyte.

EXAMPLE 34

Potassium chloride and ammonium nitrate were dissolved in a 6 M/L aqueous solution of nitric acid to obtain an electrolyte containing potassium chloride at a concentration of 0.1 M/L and ammonium nitrate at a concentration of 0.1 M/L. The concentrations of chlorine ion ($Cl^-$), nitrate ion ($NO_3^-$), aluminum ion, ammonium ion ($NH_4^+$) and alkali metal ion in the electrolyte are shown in the following Table 6.

Then, a coin type aluminum battery was assembled in the same manner as explained in Example 1 except that the electrolyte employed in Example 1 was replaced by the aforementioned electrolyte.

EXAMPLE 35

Lithium chloride and ammonium nitrate were dissolved in a 6 M/L aqueous solution of nitric acid to obtain an electrolyte containing lithium chloride at a concentration of 0.1 M/L and ammonium nitrate at a concentration of 0.1 M/L. The concentrations of chlorine ion ($Cl^-$), nitrate ion ($NO_3^-$), aluminum ion, ammonium ion ($NH_4^+$) and alkali metal ion in the electrolyte are shown in the following Table 6.

Then, a coin type aluminum battery was assembled in the same manner as explained in Example 1 except that the electrolyte employed in Example 1 was replaced by the aforementioned electrolyte.

EXAMPLE 36

Aluminum bromide and ammonium nitrate were dissolved in a 2 M/L aqueous solution of nitric acid to obtain an electrolyte containing aluminum bromide at a concentration of 0.25 M/L and ammonium nitrate at a concentration of 0.25 M/L. The concentrations of bromine ion ($Br^-$), nitrate ion ($NO_3^-$), aluminum ion and ammonium ion ($NH_4^+$) in the electrolyte are shown in the following Table 6.

Then, a coin type aluminum battery was assembled in the same manner as explained in Example 1 except that the electrolyte employed in Example 1 was replaced by the aforementioned electrolyte.

EXAMPLE 37

Aluminum iodide and ammonium nitrate were dissolved in a 2 M/L aqueous solution of nitric acid to obtain an electrolyte containing aluminum iodide at a concentration of 0.25 M/L and ammonium nitrate at a concentration of 0.25 M/L. The concentrations of iodine ion ($I^-$), nitrate ion ($NO_3^-$), aluminum ion and ammonium ion ($NH_4^+$) in the electrolyte are shown in the following Table 6.

Then, a coin type aluminum battery was assembled in the same manner as explained in Example 1 except that the electrolyte employed in Example 1 was replaced by the aforementioned electrolyte.

EXAMPLE 38

A coin type aluminum battery was assembled in the same manner as explained in Example 20 except that a molybdenum foil having a purity of 99.9% was employed as the positive electrode collector.

EXAMPLE IV

Aluminum chloride was dissolved in a 0.05 M/L aqueous solution of nitric acid to obtain an electrolyte containing aluminum chloride at a concentration of 3 M/L. The concentrations of chlorine ion (Cl$^-$), nitrate ion (NO$_3^-$) and aluminum ion in the electrolyte are shown in the following Table 6.

Then, a coin type aluminum battery was assembled in the same manner as explained in Example 1 except that the electrolyte employed in Example 1 was replaced by the aforementioned electrolyte.

EXAMPLE V

Aluminum chloride was dissolved in a 0.1 M/L aqueous solution of nitric acid to obtain an electrolyte containing aluminum chloride at a concentration of 2 M/L. The concentrations of chlorine ion (Cl$^-$), nitrate ion (NO$_3^-$) and aluminum ion in the electrolyte are shown in the following Table 6.

Then, a coin type aluminum battery was assembled in the same manner as explained in Example 1 except that the electrolyte employed in Example 1 was replaced by the aforementioned electrolyte.

EXAMPLE VI

A coin type aluminum battery was assembled in the same manner as explained in Example 20 except that aluminum having a purity of 99.8% and containing Fe at a concentration of 480 ppm, Ni at a concentration of 450 ppm, and Cu at a concentration of 490 ppm was employed as the material for the negative electrode container. The constituent components of the aluminum was analyzed by ICP emission spectrometry.

A discharge test was performed on the batteries of Examples 20 to 38, and IV to VI, wherein the battery voltage was allowed to decrease down to 0.8V with a current of 10 mA so as to measure the electromotive force and capacity of each of these batteries, the results being shown in the following Tables 7 and 8. The weight of each battery of Examples 20 to 38, and IV to VI is also shown together with the results of Comparative Examples 1 to 5 in the following Tables 7 and 8. Additionally, the pH of the electrolyte of each battery of Examples 20 to 38, IV to VI, and Comparative Examples 1 to 5 is also shown in the following Tables 5 and 6.

TABLE 5

| | Halogen ion | Conc. of halogen ion (M/L) | Conc. of sulfate ion (M/L) | Conc. of Al ion (M/L) | Conc. of ammonium ion (M/L) | Alkali metal | Conc. of alkali metal ion (M/L) | pH | Negative electrode |
|---|---|---|---|---|---|---|---|---|---|
| Example 20 | Cl$^-$ | 0.75 | 2.25 | 0.25 | 0.5 | None | 0 | −0.41 | Al metal |
| Example 21 | Cl$^-$ | 0.15 | 2.05 | 0.05 | 0.1 | None | 0 | −0.36 | Al metal |
| Example 22 | Cl$^-$ | 6 | 0.5 | 2 | 1 | None | 0 | 1.0 | Al metal |
| Example 23 | Cl$^-$ | 1 | 4 | 2 | 2 | None | 0 | 2.9 | Al metal |
| Example 24 | Cl$^-$ | 1.5 | 2 | 0.5 | 0.5 | None | 0 | −0.21 | Al metal |
| Example 25 | Cl$^-$ | 0.75 | 2.25 | 0.25 | 0.5 | None | 0 | −0.42 | Al alloy |
| Example 26 | Cl$^-$ | 0.01 | 0.5 | 0.033 | 0.2 | None | 0 | 0.3 | Al metal |
| Example 27 | Cl$^-$ | 1.2 | 0.2 | 0.4 | 0.2 | None | 0 | 0.7 | Al metal |
| Example 28 | Cl$^-$ | 0.06 | 5 | 0.02 | 0.2 | None | 0 | −0.51 | Al metal |
| Example 29 | Cl$^-$ | 0.05 | 10 | 0.0167 | 0.2 | None | 0 | −1.1 | Al metal |
| Example 30 | Cl$^-$ | 0.03 | 4.6 | 0.01 | 0.2 | None | 0 | −0.61 | Al metal |

TABLE 6

| | Halogen ion | Conc. of halogen ion (M/L) | Conc. of nitrate ion (M/L) | Conc. of Al ion (M/L) | Conc. of ammonium ion (M/L) | Alkali metal | Conc. of alkali metal ion (M/L) | pH | Negative electrode |
|---|---|---|---|---|---|---|---|---|---|
| Example 31 | Cl$^-$ | 0.3 | 2.6 | 0.1 | 0.2 | None | 0 | −0.41 | Al metal |
| Example 32 | Cl$^-$ | 3 | 1.6 | 1 | 0.2 | None | 0 | −0.21 | Al metal |
| Example 33 | Cl$^-$ | 0.75 | 2.5 | 0.25 | 0 | None | 0 | −0.42 | Al metal |
| Example 34 | Cl$^-$ | 0.1 | 3 | 0 | 6 | K$^+$ | 0.1 | −0.47 | Al metal |
| Example 35 | Cl$^-$ | 0.1 | 3 | 0 | 6 | Li$^+$ | 0.1 | −0.47 | Al metal |
| Example 36 | Br$^-$ | 0.75 | 2.25 | 0.25 | 0.5 | None | 0 | −0.36 | Al metal |
| Example 37 | I$^-$ | 0.75 | 2.25 | 0.25 | 0.5 | None | 0 | −0.36 | Al metal |
| Example 38 | Cl$^-$ | 0.75 | 2.25 | 0.25 | 0.5 | None | 0 | −0.41 | Al metal |
| Example IV | Cl$^-$ | 6 | 0.05 | 2 | 0 | None | 0 | 0.7 | Al metal |
| Example V | Cl$^-$ | 6 | 0.1 | 2 | 0 | None | 0 | −0.2 | Al metal |
| Example VI | Cl$^-$ | 0.75 | 2.25 | 0.25 | 0.5 | None | 0 | −0.41 | Al metal |

TABLE 7

| | Electromotive force (V) | Capacity (mAh) | Battery weight (g) |
|---|---|---|---|
| Example 20 | 1.85 | 200 | 2 |
| Example 21 | 1.75 | 180 | 2 |
| Example 22 | 1.74 | 150 | 2 |

TABLE 7-continued

|  | Electromotive force (V) | Capacity (mAh) | Battery weight (g) |
|---|---|---|---|
| Example 23 | 1.8 | 150 | 2 |
| Example 24 | 1.9 | 180 | 2 |
| Example 25 | 1.95 | 220 | 2 |
| Example 26 | 1.75 | 130 | 2 |
| Example 27 | 1.80 | 120 | 2 |
| Example 28 | 1.75 | 220 | 2 |
| Example 29 | 1.72 | 225 | 2 |
| Example 30 | 1.75 | 215 | 2 |
| Example 31 | 1.78 | 215 | 2 |
| Example 32 | 1.95 | 190 | 2 |
| Example 33 | 1.88 | 180 | 2 |
| Example 34 | 1.72 | 150 | 2 |
| Example 35 | 1.72 | 160 | 2 |

TABLE 8

|  | Electromotive force (V) | Capacity (mAh) | Battery weight (g) |
|---|---|---|---|
| Example 36 | 1.85 | 175 | 2 |
| Example 37 | 1.85 | 160 | 2 |
| Example 38 | 1.85 | 205 | 2.2 |
| Example IV | 1.81 | 150 | 2 |
| Example V | 1.83 | 185 | 2 |
| Example VI | 1.85 | 130 | 2 |
| Comparative example 1 | 1.7 | 100 | 2 |
| Comparative example 2 | 1.7 | 50 | 2 |
| Comparative example 3 | 1.3 | 5 | 2 |
| Comparative example 4 | 1.5 | 30 | 2 |
| Comparative example 5 | 1.6 | 100 | 3.5 |

As seen from these Tables 5 to 8, the batteries of Examples 20 to 38 and IV to VI, each of which was provided with an electrolyte containing both halogen ion and nitrate ion, were found improved in terms of the voltage and capacity thereof, and also found possible to decrease the weight of battery.

Upon finishing this discharge test, each of batteries of Examples 34 and 35 was disassembled to measure the components of electrolyte thereof. As a result, aluminum ion was found existed in the electrolyte, the concentration of aluminum ion in each of these electrolytes being less than 0.1 M/L.

EXAMPLE 39

Manufacture of the Positive Electrode

As a positive electrode active material, electrolytic manganese dioxide ($MnO_2$) was employed. Then, this electrolytic manganese dioxide was mixed with 10% by weight of acetylene black as a conductive agent and 3% by weight of polytetrafluoroethylene as a binder to form a mixture, which is then compression-molded into a cylindrical configuration to manufacture a positive electrode mixture.

As for the positive electrode collector, a carbon film having a thickness of 100 μm and formed of carbon fiber was employed.

Manufacture of the Negative Electrode

Aluminum powder was prepared as a negative electrode active material. It was found through the analysis of this aluminum powder by means of ICP emission spectrometry that the purity of this aluminum was 99.99%, and that this aluminum powder contained Fe at a concentration of 20 ppm, Ni at a concentration of 5 ppm, and Cu at a concentration of 10 ppm.

Then, 95% by weight of this aluminum powder and 5% by weight of silicic anhydride as a thickener were mixed together to obtain a mixture, to which an electrolyte was added to prepare a negative electrode gel.

Further, as a negative electrode collector, a stainless steel rod was prepared.

Assembling of Battery

Thereafter, the cylindrical positive electrode mixture and a separator made of a glass fiber sheet having a thickness of 30 μm were placed inside a bottomed cylindrical positive electrode collector, and then, the negative electrode gel was introduced into this separator, after which the same kind of electrolyte as employed in the aforementioned Example 1 was introduced into all of these positive electrode mixture, separator and negative electrode gel. Subsequently, the negative electrode collector was placed into the negative electrode gel, and then, a sealing process was performed by making use of a bottom plate as a negative terminal plate, a positive terminal and a case made of polypropylene, thereby assembling a cylindrical aluminum battery having a structure as shown in FIG. 2, the diameter thereof being 14 mm and the total height thereof being 50 mm.

EXAMPLE 40

A cylindrical aluminum battery was assembled in the same manner as explained in Example 39 except that the same kind of electrolyte as employed in Example 20 was employed in place of the electrolyte of Example 39.

EXAMPLE 41

A cylindrical aluminum battery was assembled in the same manner as explained in Example 39 except that acrylonitrile/butadiene/styrene (ABS) resin was employed as a case material in place of polypropylene employed in Example 39.

EXAMPLE 42

A cylindrical aluminum battery was assembled in the same manner as explained in Example 39 except that ethylene-propylene copolymer was employed as a case material in place of polypropylene employed in Example 39.

EXAMPLE VII

A cylindrical aluminum battery was assembled in the same manner as explained in Example 39 except that an aluminum alloy having the following composition was employed as a negative electrode active material.

It was found through the analysis by means of ICP emission spectrometry that this aluminum alloy contained Al, Cr, Zn, Fe, Ni and Cu, wherein the content of Cr was 0.3%, the content of Zn was 0.2%, the content of Fe was 5 ppm, the content of Ni was 1 ppm and the content of Cu was 5 ppm.

COMPARATIVE EXAMPLE 6

A cylindrical aluminum battery was assembled in the same manner as explained in Example 39 except that as an electrolyte, the same kind of material as employed in Comparative Example 1 was employed.

COMPARATIVE EXAMPLE 7

A cylindrical aluminum battery was assembled in the same manner as explained in Example 39 except that as an electrolyte, the same kind of material as employed in Comparative Example 2 was employed.

COMPARATIVE EXAMPLE 8

A cylindrical aluminum battery was assembled in the same manner as explained in Example 39 except that as an electrolyte, the same kind of material as employed in Comparative Example 3 was employed.

COMPARATIVE EXAMPLE 9

A cylindrical aluminum battery was assembled in the same manner as explained in Example 39 except that as an electrolyte, the same kind of material as employed in Comparative Example 4 was employed.

COMPARATIVE EXAMPLE 10

A zinc/manganese battery was prepared employing zinc as the negative electrode thereof, and a 1 M/L aqueous solution of zinc chloride as the electrolyte thereof.

A discharge test was performed on the batteries of Examples 39 to 42, VII, and Comparative Examples 6 to 10, wherein the battery voltage was allowed to decrease down to 0.8V with a current of 100 mA so as to measure the electromotive force and capacity of each of these batteries, the results being shown in the following Table 9.

TABLE 9

|  | Electromotive force (V) | Capacity (mAh) |
| --- | --- | --- |
| Example 39 | 1.85 | 3000 |
| Example 40 | 1.85 | 2900 |
| Example 41 | 1.85 | 3000 |
| Example 42 | 1.85 | 3000 |
| Example VII | 1.83 | 3200 |
| Comparative example 6 | 1.7 | 1500 |
| Comparative example 7 | 1.7 | 600 |
| Comparative example 8 | 1.3 | 300 |
| Comparative example 9 | 1.5 | 450 |
| Comparative example 10 | 1.5 | 1000 |

As seen from these Table 9, the batteries of Examples 39 to 42 and VII, each of which was provided with an electrolyte containing both halogen ion and sulfate ion, were found higher in voltage as compared with that of Comparative Examples 8 to 10, and also found possible to enhance the capacity of battery as compared with that of Comparative Examples 6 to 10.

As explained above, it is possible according to the aluminum battery of this invention to achieve prominent effects such as the improvement in voltage and capacity of battery, and the reduction in weight of battery.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An aluminum battery comprising:
   a positive electrode containing at least one kind of active material selected from the group consisting of a metal oxide, a metal sulfide and a conductive polymer;
   a negative electrode containing at least one kind of active material selected from the group consisting of aluminum metal and aluminum alloys; and
   an electrolyte containing an aqueous solution which contains halogen ion and 0.05 M/L to 10 M/L of nitrate ion.

2. The aluminum battery according to claim 1, wherein the concentration of said halogen ion in the electrolyte is within the range of 0.01 to 6 M/L.

3. The aluminum battery according to claim 1, wherein the concentration of said halogen ion in the electrolyte is within the range of 0.01 to 6 M/L and the concentration of said nitrate ion is within the range of 0.2 to 10 M/L.

4. The aluminum battery according to claim 1, wherein said electrolyte further contains ammonium ion.

5. The aluminum battery according to claim 1, wherein the purity of said aluminum metal is not less than 99.5%.

6. The aluminum battery according to claim 1, wherein said aluminum alloy contains Al and at least one kind of element selected from the group consisting of Mn, Cr, Sn, Ca, Mg, Pb, Si, In and Zn.

7. The aluminum battery according to claim 1, wherein said aluminum metal and said aluminum alloy contain at least one kind of transition metal element selected from the group consisting of Fe, Ni and Cu, the content of each of these transition metal elements in said aluminum metal being within the range of 0 to 500 ppm, and the content of each of these transition metal elements in said aluminum alloy being within the range of 0 to 500 ppm.

8. The aluminum battery according to claim 1, wherein said aluminum metal and said aluminum alloy contain at least one kind of transition metal element selected from the group consisting of Fe, Ni and Cu, the content of each of these transition metal elements in said aluminum metal being within the range of 0 to 100 ppm, and the content of each of these transition metal elements in said aluminum alloy being within the range of 0 to 100 ppm.

9. The aluminum battery according to claim 1, wherein the electrolyte further contains sulfate ion.

10. The aluminum battery according to claim 1, wherein the concentration of the halogen ion in the electrolyte is within the range of 0.05 to 1 M/L.

11. The aluminum battery according to claim 1, wherein the concentration of the nitrate ion is within the range of 0.5 to 5 M/L.

12. The aluminum battery according to claim 1, wherein said at least one kind of active material is selected from the group consisting of manganese dioxide, lead dioxide, nickel hydroxide, nickel oxyhydroxide, silver oxide, iron oxides, iron sulfide, nickel sulfide, polyaniline, polypyrrole, and an organosulfur compound.

13. An aluminum battery comprising:
   a positive electrode comprising a collector and a positive electrode mixture provided at said collector, said collector containing at least one kind of conductive component selected from the group consisting of tungsten, molybdenum, lead, titanium nitride and a carbonaceous material;
   a negative electrode containing at least one kind of active material selected from the group consisting of aluminum metal and aluminum alloys; and
   an electrolyte containing halogen ion and at least one kind of ion selected from the group consisting of sulfate ion and nitrate ion, wherein the positive electrode mixture contains at least one kind of active material selected from the group consisting of a metal oxide, a metal sulfides and a conductive polymer.

14. An aluminum battery comprising:
a conductive container;
a positive electrode mixture electrically connected to the conductive container and containing at least one kind of active material selected from the group consisting of a metal oxide, a metal sulfide and a conductive polymer;
a negative electrode provided in in the conductive container, containing at least one kind of active material selected from the group consisting of aluminum metal and aluminum alloys; and
an aqueous electrolyte provided in the conductive container, containing halogen ion; and at least one kind of ion selected from the group consisting of a sulfate ion and a nitrate ion;
an outer packaging tube arranged around conductive container; and
a case arranged between the outer packaging tube and the conductive container and having an inner surface made of a resin material.

15. The aluminum battery according to claim 14, wherein said resin material contains at least one kind of resin selected from the group consisting of polyolefin resin, acrylonitrile/styrene (AS) resin, acrylonitrile/butadiene/styrene (ABS) resin and ethylene/propylene copolymer.

16. The aluminum battery according to claim 14, wherein the thickness of the case is 0.5 mm or less.

17. The aluminum battery according to claim 14, wherein the conductive container is formed of at least one type of material selected from the group consisting of tungsten, molybdenum, lead, titanium nitride and carbonaceous materials.

18. An aluminum battery comprising:
a positive electrode containing at least one kind of active material selected from the group consisting of a metal oxide, a metal sulfide and a conductive polymer;
a negative electrode containing at least one kind of active material selected from the group consisting of aluminum metal and aluminum alloys; and
an electrolyte containing an aqueous solution which contains halogen ion, aluminum ion and 0.05 M/L to 10 M/L of nitrate ton.

19. The aluminum battery according to claim 18, wherein the concentration of said halogen ion in the electrolyte is within the range of 0.01 to 6 M/L, the concentration of said at least one kind of ion selected from the group consisting of sulfate ion and nitrate ion is within the range of 0.05 to 10 M/L, and the concentration of said aluminum ion is within the range of 0.01 to 2 M/L.

20. The aluminum battery according to claim 18, wherein the concentration of said halogen ion in the electrolyte is within the range of 0.01 to 6 M/L, the concentration of said at least one kind of ion selected from the group consisting of sulfate ion and nitrate ion is within the range of 0.2 to 10 M/L, and the concentration of said aluminum ion is within the range of 0.01 to 2 M/L.

21. The aluminum battery according to claim 18, wherein said electrolyte further contains ammonium ion.

22. The aluminum battery according to claim 13, wherein the purity of said aluminum metal is not less than 99.5%.

23. The aluminum battery according to claim 18, wherein said aluminum alloy contains Al and at least one kind of element selected from the group consisting of Mn, Cr, Sn, Ca, Mg, Pb, Si, In and Zn.

24. The aluminum battery according to claim 18, wherein said aluminum metal and said aluminum alloy contain at least one kind of transition metal element selected from the group consisting of Fe, Ni and Cu, the content of each of these transition metal elements in said aluminum metal being within the range of 0 to 500 ppm, and the content of each of these transition metal elements in said aluminum alloy being within the range of 0 to 500 ppm.

25. The aluminum battery according to claim 18, wherein said aluminum metal and said aluminum alloy contain at least one kind of transition metal element selected from the group consisting of Fe, Ni and Cu, the content of each of these transition metal elements in said aluminum metal being within the range of 0 to 100 ppm, and the content of each of these transition metal elements in said aluminum alloy being within the range of 0 to 100 ppm.

26. An aluminum battery comprising:
a positive electrode comprising a collector and a positive electrode mixture provided at said collector, said collector containing at least one kind of conductive component selected from the group consisting of tungsten, molybdenum, lead, titanium nitride and a carbonaceous material;
a negative electrode containing at least one kind of active material selected from the group consisting of aluminum metal and aluminum alloys; and
an electrolyte containing halogen ion, aluminum ion and at least one kind of ion selected from the group consisting of a sulfate ion and a nitrate ion,
wherein the positive electrode mixture contains at least one kind of active material selected from the group consisting of a metal oxide, a metal sulfide and a conductive polymer.

27. An aluminum battery comprising:
a positive electrode comprising a collector and a positive electrode mixture provided at said collector, said collector containing at least one kind of conductive component selected from the group consisting of tungsten, molybdenum, lead and titanium nitride;
a negative electrode containing at least one kind of active material selected from the group consisting of aluminum metal and aluminum alloys; and
an electrolyte containing halogen ion, aluminum ion and at least one kind of ion selected from the group consisting of a sulfate ion and a nitrate ion,
wherein the positive electrode mixture contains at least one kind of active material selected from the group consisting of a metal oxide, a metal sulfide and a conductive polymer.

28. An aluminum battery comprising:
a positive electrode comprising a collector and a positive electrode mixture provided at said collector, said collector containing carbonaceous material;
a negative electrode containing at least one kind of active material selected from the group consisting of aluminum metal and aluminum alloys; and
an aqueous electrolyte containing halogen ion, aluminum ion and at least one kind of ion selected from the group consisting of a sulfate ion and a nitrate ion,
wherein the positive electrode mixture contains at least one kind of active material selected from the group consisting of a metal oxide, a metal sulfide and a conductive polymer.

29. An aluminum battery comprising:

a conductive container;

a positive electrode mixture electrically connected to the conductive container and containing at least one kind of active material selected from the group consisting of a metal oxide, a metal sulfide and a conductive polymer;

a negative electrode provided in the conductive container, containing at least one kind of active material selected from the group consisting of aluminum metal and aluminum alloys; and an aqueous electrolyte provided in the conductive container, containing halogen ion, aluminum ion and at least one kind of ion selected from the group consisting of a sulfate ion and a nitrate ion;

an outer packaging tube arranged around the conductive container; and a case arranged between the outer packaging tube and the conductive container and having an inner surface made of resin material.

30. The aluminum battery according to claim 29, wherein said resin material contains at least one kind of resin selected from the group consisting of polyolefin resin, acrylonitrile/styrene (AS) resin, acrylonitrile/butadiene/styrene (ABS) resin and ethylene/propylene copolymer.

* * * * *